(No Model.)
J. M. SMITH.
COUPLING FOR CARRIAGE POLES.
No. 419,371. Patented Jan. 14, 1890.
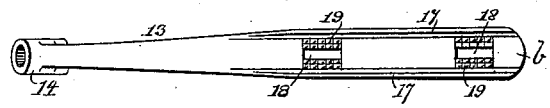
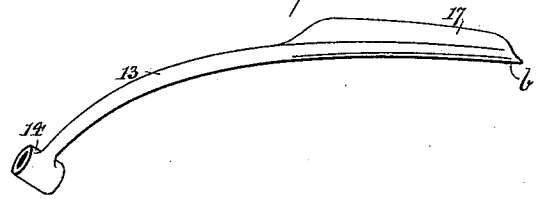
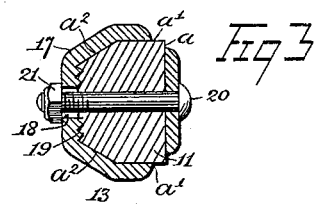
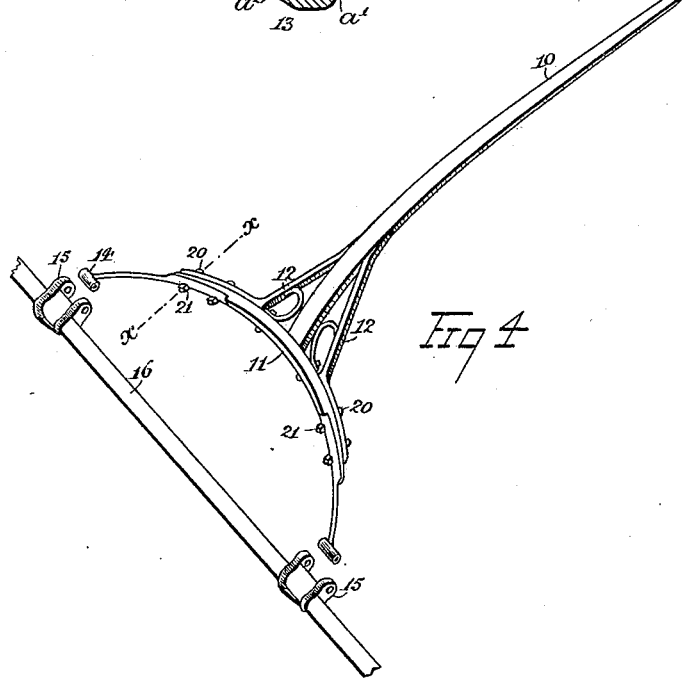
WITNESSES:
H. Walker
C. Sedgwick
INVENTOR:
J. M. Smith
BY Munn & Co.
ATTORNEYS.

UNITED STATES PATENT OFFICE.

JAMES MERRITT SMITH, OF GREENWICH, CONNECTICUT.

COUPLING FOR CARRIAGE-POLES.

SPECIFICATION forming part of Letters Patent No. 419,371, dated January 14, 1890.

Application filed June 20, 1889. Serial No. 314,894. (No model.)

*To all whom it may concern:*

Be it known that I, JAMES MERRITT SMITH, of Greenwich, in the county of Fairfield and State of Connecticut, have invented a new and Improved Coupling for Carriage-Poles, of which the following is a full, clear, and exact description.

My invention relates to an improvement in couplings for carriage-poles, and has for its object to provide a coupling of simple and durable construction, and to provide a means whereby, when the coupling is attached to a pole, the pole may be readily adapted for attachment to axles having thill-ears at different distances apart.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a plan view of one of the couplings. Fig. 2 is a side elevation of the same. Fig. 3 is a transverse section through a coupling attached to a pole, taken on line $x\ x$ of Fig. 4; and Fig. 4 is a perspective view of a pole having the coupling applied, and also a partial perspective view of the axle to which the couplings are to be attached.

In carrying out the invention the pole 10 is connected in any suitable or approved manner to a curved bar 11, which bar extends beyond each side of the pole, as illustrated in Fig. 4, the said bar and pole being usually braced by angled irons 12. This pole-bar 11 is preferably made, as illustrated in Fig. 3, with a vertical outer surface $a$, a vertical inner surface of less width than the outer surface, and horizontal upper and lower surfaces $a'$, extending from the front surface, preferably to a point at or near the vertical center of the bar, and being beveled from said point to the inner surface of the bar, as shown at $a^2$ in Fig. 3.

The coupling 13 consists of a piece of metal curved to form a continuation of the curve of the pole-bar 11, and the said coupling is made to terminate at its outer extremity in a central bored sleeve or socket 14, which sleeve or socket is adapted to be placed between ears 15, clipped or otherwise secured to the axle 16. The inner portion of the coupling is adapted to engage with the extremity of the pole-bar 11, as illustrated in Fig. 4, one coupling being secured to each extremity of the said bar. At the point of contact of the coupling with the pole-bar the inner face of the coupling is flat, as illustrated at $b$ in Fig. 1, and the longitudinal side edges are provided with an upwardly-extending angled flange 17. The inner face of each of the said flanges 17, and preferably likewise the outer face, is made to conform to the horizontal upper and lower and inner beveled surfaces of the pole-bar. The distance between the side flanges 17 is such that when the coupling is placed upon the pole-bar it will snugly fit the sides of the same, as shown in Fig. 3, and the inner surface of the coupling is of such width that the contracted inner surface of the pole bar will neatly fit thereon.

In the flat surface $b$ of the coupling, between the flanges 17, two longitudinal openings 18 are preferably produced, and at each side of each of the said openings a series of upwardly-projecting teeth 19 is formed, which teeth ordinarily constitute an integral portion of the coupling.

The horizontal member of the angled irons 12, forming the braces for the pole-bar, is preferably made of such length that it will extend to the extremity of the pole-bar, as shown in Fig. 4, and when the coupling has been placed upon the pole-bar bolts 20 are passed through the horizontal member of the angled iron, through the pole-bar, and through the opening in the coupling—one bolt being provided for each opening—and upon the inner or threaded end of each bolt a nut 21 is screwed, or other form of locking device equivalent to this may be employed.

It will be readily observed that as the body of the coupling is made to conform to the upper, lower, and inner surfaces of the pole-bar it will cling closely thereto, and, further, that when the nuts 21 are screwed up tight to a contact with the coupling the teeth 19 will be forced into the inner or contracted surface of the pole-bar, and the said coupling will thereby be effectually prevented from having the slightest lateral movement. It will be further observed that as the openings 18 are of greater length than is necessary to accommodate the bolts 20 the coupling may be readily adjusted upon the pole-bar by loosening the nuts 21 to fit various axles having their thill-ears located at different distances apart.

Having thus described my invention, I claim as new and desire to secure by Letters Patent—

1. As an improved article of manufacture, an adjustable coupling adapted for use in connection with a pole-bar, consisting of a curved forging or casting having an eye or its equivalent at its outer extremity, and provided with a flat inner surface having longitudinal openings produced therein, teeth at each side of the said openings, and an angled flange projected upward from each side of the flat surface, substantially as shown and described.

2. The combination, with a vehicle-pole and a curved pole-bar secured thereto having a vertical outer surface, a vertical inner surface narrower than the outer surface, and angular upper and lower surfaces, of a coupling adapted for attachment to the extremities of the pole-bar, comprising a curved casting or forging having a sleeve or eye at its outer end, a flat inner body-surface corresponding in width to the width of the inner surface of the pole-bar and provided with a series of longitudinal openings, teeth at each side of each opening, an angled flange projected from the flat surface of the body conforming to the contour of the upper, lower, and inner surfaces of the pole-bar, bolts passed through the pole-bar and openings, and a locking device secured to the said bolts, substantially as and for the purpose specified.

JAMES MERRITT SMITH.

Witnesses:
R. JAY WALSH,
JAS. H. WALSH.